(12) United States Patent
Ahearn et al.

(10) Patent No.: US 10,807,412 B1
(45) Date of Patent: Oct. 20, 2020

(54) WHEEL AND WHEEL MOUNT

(71) Applicant: ALLEN FIELD COMPANY, INC., Brightwaters, NY (US)

(72) Inventors: Robert Ahearn, Massapequa, NY (US); Eric Seger, Wantagh, NY (US); Andrew Franzone, Jr., Bay Shore, NY (US)

(73) Assignee: ALLEN FIELD COMPANY, INC., Brightwaters, NY (US)

( * ) Notice: Subject to any disclaimer, the term of this patent is extended or adjusted under 35 U.S.C. 154(b) by 0 days.

(21) Appl. No.: 16/389,011

(22) Filed: Apr. 19, 2019

(51) Int. Cl.
*B60B 33/00* (2006.01)
*B65G 7/04* (2006.01)

(52) U.S. Cl.
CPC ........ *B60B 33/001* (2013.01); *B60B 33/0026* (2013.01); *B60B 33/0028* (2013.01); *B60B 33/0039* (2013.01); *B65G 7/04* (2013.01)

(58) Field of Classification Search
CPC .............. B63B 33/001; B63B 33/0026; B63B 33/0039; B63B 33/0042; B63B 33/0002; B63B 33/0028; B63B 33/0047; B63B 33/0049; B63B 33/0057; A45C 5/14; B60B 2200/45; B60B 2900/115; B62B 5/0083; B60G 7/04
See application file for complete search history.

(56) References Cited

U.S. PATENT DOCUMENTS

| | | | | | |
|---|---|---|---|---|---|
| 3,285,620 | A | * | 11/1966 | Mitty | A45C 13/385 280/47.26 |
| 3,990,375 | A | * | 11/1976 | Adams | D05B 43/00 112/258 |
| 4,026,570 | A | * | 5/1977 | Feinberg | A45C 5/143 280/47.17 |
| 4,335,896 | A | * | 6/1982 | Koffler | A45C 5/143 16/30 |
| 4,719,663 | A | * | 1/1988 | Termini | B60B 33/0002 16/30 |
| 4,772,035 | A | * | 9/1988 | Danial | B60B 33/0002 16/30 |
| 5,575,361 | A | * | 11/1996 | Chou | A45C 5/14 16/18 R |
| 5,590,748 | A | * | 1/1997 | Chang | A45C 13/262 16/113.1 |
| 6,113,196 | A | * | 9/2000 | Kuo | A45C 5/14 190/18 A |
| 6,193,324 | B1 | * | 2/2001 | Chang | A45C 5/14 190/18 A |

(Continued)

*Primary Examiner* — Chuck Y Mah
(74) *Attorney, Agent, or Firm* — Epstein Drangel LLP; Robert L. Epstein

(57) ABSTRACT

The mount includes a base formed of a substantially planar side wall and a substantially planar bottom wall. The interior surfaces of the walls intersect at a right angle. Each of the walls has an opening. The wall openings together form a recess adapted to receive the wheel. A first notched protrusion extends from the side wall interior surface and is intended to be received in a slot adjacent a cut-out on the side wall of a container on which the mount is installed. A second protrusion, having two portions situated as an angle extends from the bottom wall interior surface of the mount and is intended to be received in a slot adjacent a cut-out on the bottom of the container.

2 Claims, 4 Drawing Sheets

(56) References Cited

U.S. PATENT DOCUMENTS

| | | | | |
|---|---|---|---|---|
| D439,410 S | * | 3/2001 | Chang | A45C 5/14 D3/318 |
| 6,231,130 B1 | * | 5/2001 | Chang | A45C 5/14 190/18 A |
| 6,322,156 B1 | * | 11/2001 | Kuo | A45C 5/14 190/18 A |
| 6,354,412 B1 | * | 3/2002 | Kuo | A45C 5/14 190/18 A |
| D539,543 S | * | 4/2007 | Wu | B60B 33/0002 D3/318 |
| 7,237,660 B2 | * | 7/2007 | Wu | A45C 5/146 190/115 |
| 7,600,294 B2 | * | 10/2009 | Hartman | B60B 33/0002 16/29 |
| 8,480,192 B2 | * | 7/2013 | Yuan | H05K 5/0234 312/249.8 |
| 8,657,309 B2 | * | 2/2014 | Taylor | B60B 33/0007 280/47.32 |
| 8,783,431 B2 | * | 7/2014 | Wu | A45C 5/143 16/30 |
| 2002/0144375 A1 | * | 10/2002 | Drucker | B60B 33/0063 16/18 R |
| 2004/0201188 A1 | * | 10/2004 | Sadow | B60C 5/12 280/47.26 |
| 2006/0207848 A1 | * | 9/2006 | Sher | A45C 5/14 190/18 A |
| 2008/0078637 A1 | * | 4/2008 | Su | A45C 5/14 190/18 A |
| 2014/0041978 A1 | * | 2/2014 | Chang | A45C 7/0018 190/18 A |

\* cited by examiner

WHEEL AND WHEEL MOUNT

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A "SEQUENCE LISTING", A TABLE, OR A COMPUTER PROGRAM LISTING APPENDIX SUBMITTED ON COMPACT DISC

Not Applicable

BACKGROUND OF THE INVENTION

1. Field of the Invention

The present invention relates to a wheel and a wheel mount for attaching the wheel to a container such as a cardboard box or carton to facilitate the movement thereof.

2. Description of Prior Art Including Information Disclosed Under 37 CFR 1.97 and 1.98

Containers such as cardboard boxes or cartons are used frequently to store and ship many types of products. During storage and shipping, the products must be warehoused and transported from one location to another. Because the filled containers are often quite heavy, it may be difficult for personnel to simply pick the containers up and carry them from place to place. It is therefore necessary to place the containers on a trolley with wheels or, for larger loads, on a pallet for movement by a forklift.

However, trolleys and pallets are costly and require storage when not in use. Further, they need periodic maintenance and repair. They wear out and need replacement.

There is therefore a need for a simple, inexpensive means of converting a container such as cardboard box or carton into a mobile container which can be easily moved from one location to another without the necessity of a trolley or pallet.

BRIEF SUMMARY OF THE INVENTION

The present invention relates to a mount for a wheel with an axle. The mount includes a base. The base includes a substantially planar side wall having an interior surface and a substantially planar bottom wall having an interior surface. The side wall interior surface and the bottom wall interior surface intersect at a right angle. Each of the walls has an opening. The side wall opening and the bottom wall opening meet to form a recess adapted to receive the wheel.

A first protrusion extends from the interior surface of the side wall. A second protrusion extends from the interior surface of the bottom wall.

The first protrusion extends in a plane substantially parallel to the plane of the bottom wall. It includes at least one notch.

The second protrusion is formed of two portions. The first portion of the second protrusion extends in a plane substantially parallel to the plane of the side wall. The second portion of the second protrusion extends from the first portion of the second protrusion at an angle of less than 90 degrees. The first portion and the second portion of the second protrusion are joined by an arcuate portion.

The wheel receiving recess is further defined by an arcuate cover member extending between the interior surface of the bottom wall and the interior surface of the side wall. The cover member isolates the wheel.

The wheel receiving recess also includes a cavity adapted to receive a bushing. The bushing has an opening adapted to receive an end of the wheel axle.

Another aspect of the present invention includes, in combination, a container with a side and a bottom which meet at a corner, a cut-out at the corner, a first slot in the container side spaced from the cut-out and a second slot in the container bottom spaced from the cut-out.

The combination also includes a mount for a wheel with an axle. The mount includes a base adapted to be at least partially received in the container cut-out. The mount base includes a substantially planar side wall having an interior surface and a substantially planar bottom wall having an interior surface. The interior surface of the mount side wall and the interior surface of the mount bottom wall intersect at a right angle. Each of the walls has an opening. The mount side wall opening and the mount bottom wall opening meet to form a recess adapted to receive the wheel.

A first protrusion extends from the interior surface of the mount side wall and is adapted to be received in the first slot. A second protrusion extends from the interior surface of the mount bottom wall and is adapted to be received in the second slot.

The first protrusion extends in a plane substantially parallel to the plane of the mount bottom wall.

The second protrusion includes a first portion and a second portion. The first portion of the second protrusion extends in a plane substantially parallel to the plane of the mount side wall. The second portion of the second protrusion extends from the first portion of the second protrusion at an angle of less than 90 degrees. The first and second portions of second protrusion are joined by an arcuate portion.

The wheel receiving recess further includes an arcuate cover member extending between the interior surface of the mount bottom wall and the interior surface of the mount side wall. The cover member serves to isolate the wheel from the contents of the container.

The mount further includes a bushing adapted to receive one end of the wheel axle. the base has a cavity adjacent the wheel receiving recess adapted to receive the bushing.

The first mount protrusion is adapted to be received in the slot in the side wall of the container. It has at least one notch which serves to anchor the protrusion in the container side wall.

The second mount protrusion is adapted to be received in the slot in the bottom of the container. The purpose of the second protrusion is to facilitate instillation of the mount on the container.

BRIEF DESCRIPTION OF THE SEVERAL VIEWS OF DRAWINGS

To these and to such other objects that may hereinafter appears, the present invention relates to a wheel and a wheel mount as described in detail in the following specification and recited in the annexed claims, taken together with the accompanying drawings, in which like numerals refer to like parts and in which:

DETAILED DESCRIPTION OF THE INVENTION

Figure 1:
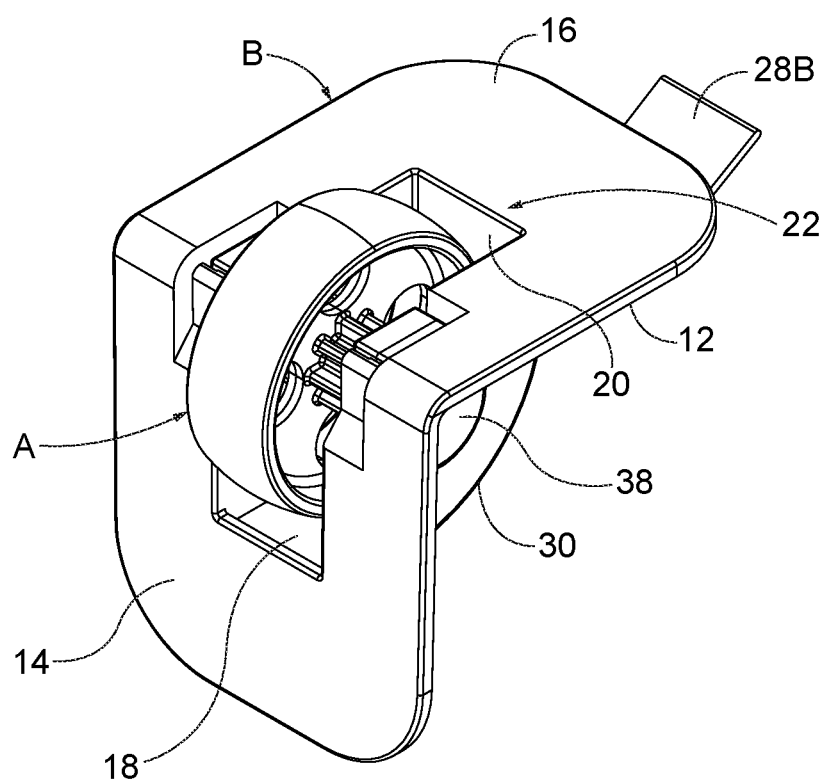
FIG. 1 is a perspective view of the present invention showing the wheel and the exterior surface of the bottom and side walls of the mount.

As seen in the Figures, the present invention relates to a wheel, generally designated A, and a mount, generally designated B, for attaching for the wheel to a container, such as a cardboard box or carton, generally designated C.

Wheel A is mounted on an axle 10. Axle 10 extends outwardly of the wheel a short distance on either side of the wheel. Wheel A may have a series of circular openings to conserve the plastic material from which it is formed and to reduce the weight of the wheel.

Mount B includes a base 12. Base 12 includes a substantially planar side wall 14 having an interior surface 14A. Base 12 also includes a substantially planar bottom wall 16 having an interior surface 16A. Side wall interior surface 14A and bottom wall interior surface 16A intersect at a right angle.

Note that the designation of the mount walls as "side" and "bottom" are meant to reflect the position of the walls relative to container C when the wheel is mounted on the container. Those designations are not intended to in any way limit the scope of the invention.

Side wall 14 has a rectangular opening 18. Bottom wall 16 has a rectangular opening 20. Side wall opening 18 and bottom wall opening 20 meet at the intersection of the mount walls to form a recess 22 (FIG. 3) which is adapted to receive the wheel.

A first protrusion 24 extends from the side wall interior surface 14A in a plane substantially parallel to the plane of bottom wall 16. Protrusion 24 is elongated in a direction parallel to the wheel axle 10.

Preferably, protrusion 24 carries one or more notches 26 on one or both sides thereof. Notches 26 are preferably triangular in cross-section such that they facilitate the insertion of the protrusion into a slot in the side of the container and once inserted, prevent the protrusion from being accidentally dislodged from the container slot.

Figure 4:
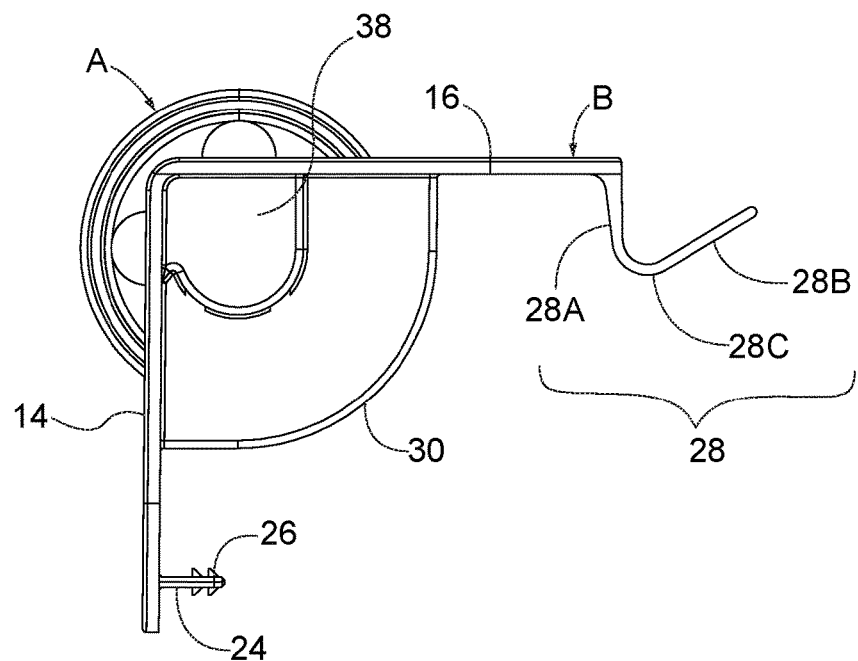
FIG. 4 is an elevation view of one side of the present invention.

A second protrusion 28 extends from the bottom wall interior surface 16A. Protrusion 28 has two portions 28A and 28B. Portion 28A extends in a plane substantially parallel to the plane of side wall 14. Second portion 28B extends from first portion 28A at an angle of less than 90 degrees (FIG. 4). First protrusion portion 28A and second protrusion portion 28B are joined at an arcuate portion 28C.

Figure 2:
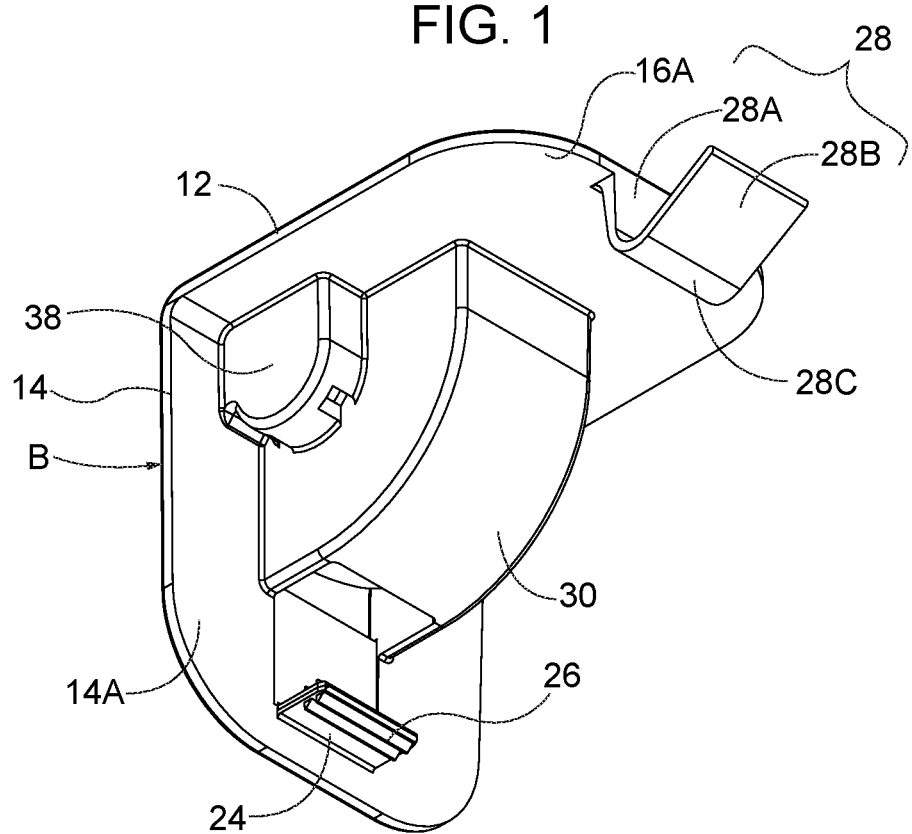
FIG. 2 is a perspective view of the present invention showing the interior surface of the bottom and side walls of the mount, including the wheel cover and protrusions.
Figures 5, 6:
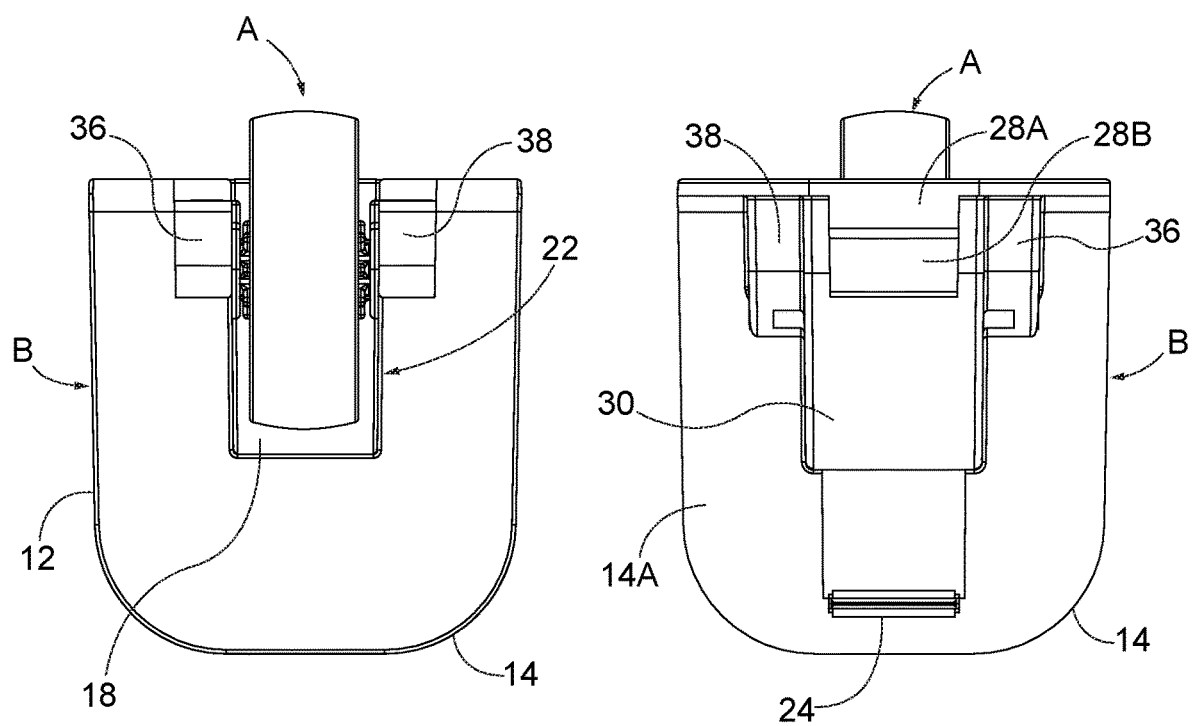
FIG. 5 is an elevation view of the wheel and exterior surface of the side wall of the mount of the present invention.
FIG. 6 is an elevation view of the interior surface of the side wall of the mount of the present invention.

As best seen in FIGS. 2, 4 and 6, the wheel receiving recess 22 further comprises an arcuate cover member 30 extending between the interior surface 14A of the side wall and the interior surface 16A of the bottom wall. The purpose of cover member 30 is to isolate the contents of the container from the wheel.

Figure 3:
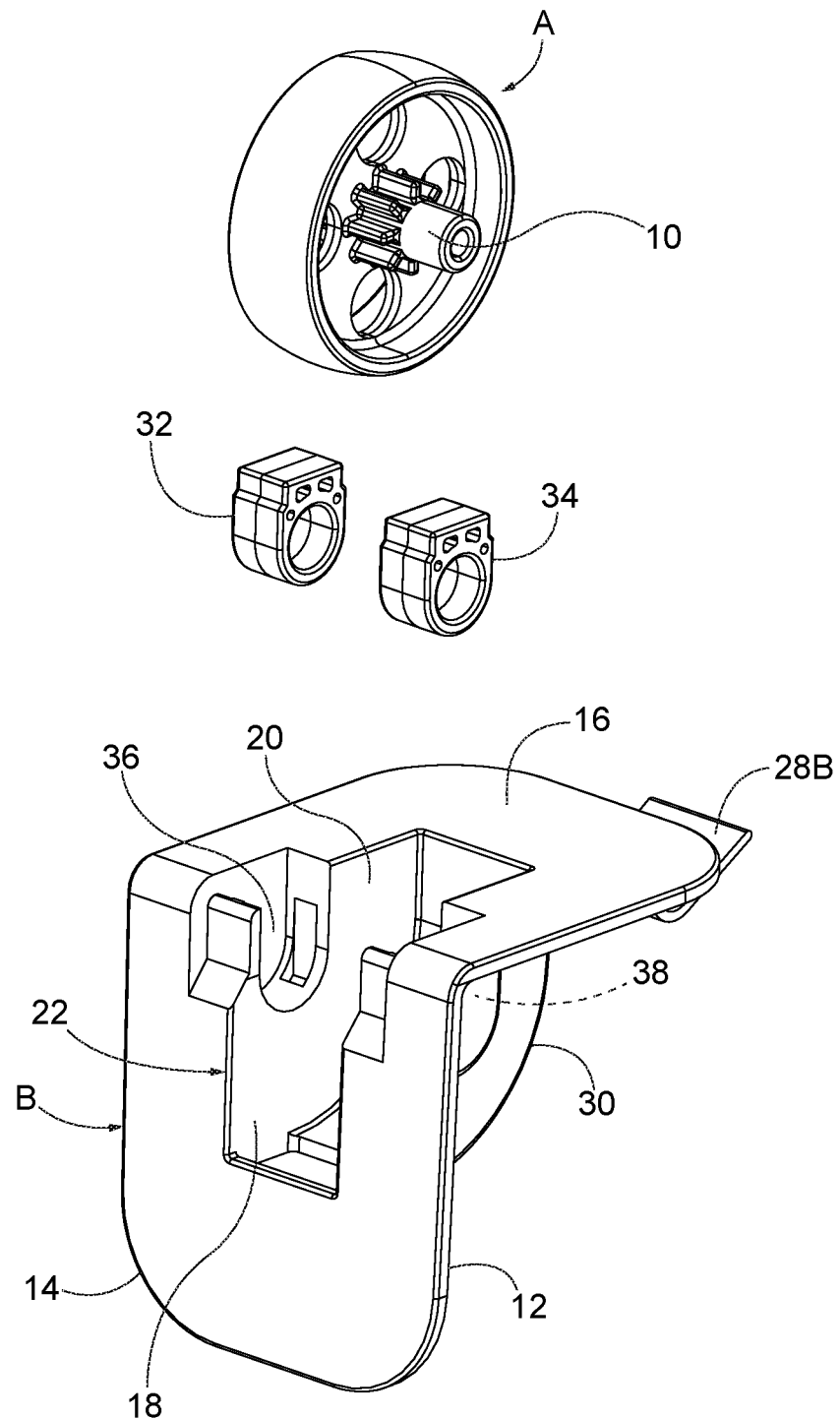
FIG. 3 is an exploded perspective view of the parts of the present invention.

As best seen in FIG. 3, bushings 32 and 34 are provided, each of which is adapted to receive a different end of the wheel axle 10. The bushings are received in cavities 36, 38 in the base on either side of wheel receiving recess 22, respectively. The cavities retain the bushings in proper position on the mount and isolate the bushings from the contents of the container.

Figure 7:
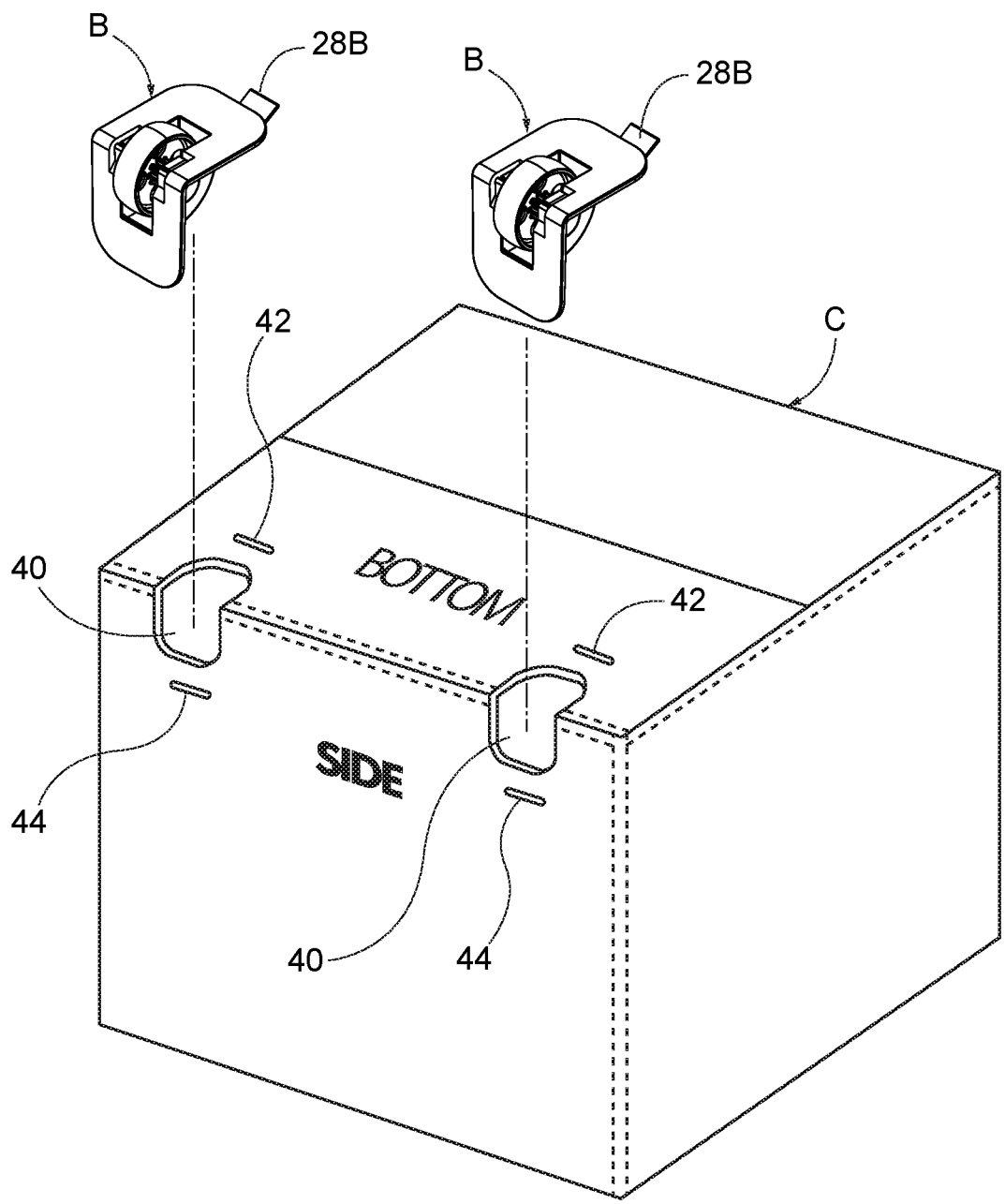
FIG. 7 is a perspective view of a container in the form of a cardboard box or container with cut-outs and slots therein adapted to receive two wheel mounts of the present invention.

FIG. 7 shows a typical container C adapted for use with mount B, in the form of a cardboard box or carton. Prior to the installation of the mount, the container is prepared by creating spaced cut-outs 40 across the corner where to bottom of the container meets the side of the container. Situated a short distance from the edge of each cut-out 40 along the bottom of the container is a slot 42. Situated a short distance from the edge of each cut-out on the side of the container is a slot 44.

In order to install each mount on the container, portion 28B of protrusion 28 is inserted into slot 42 until portion 28C is adjacent the edge of slot 42. The mount is then pivoted to a position relative to the container where the wheel recess cover 30 is aligned with the cut-out 40 and protrusion 24 is aligned with slot 44 on the side of the container. In that position, the mount can be moved toward the container such that portion 28A of protrusion 28 is fully received in slot 42 and protrusion 24 is fully seated with slot 44. The interior surface 14A of side wall 14 will then be adjacent to the surface of the side of the container and the interior surface 16A of wall 16 will be adjacent the surface of the bottom of the container. The notches 26 on protrusion 24 will maintain the mount on the container.

While only a single preferred embodiment of the present invention has been disclosed for purposes of illustration, it is obvious that many modifications and variations could be made thereto. It is intended to cover all of those modifications and variations which fall within the scope of the present invention, as defined by the following claims:

We claim:

1. A mount for a wheel with an axle, said mount comprising a base, said base comprising a substantially planar side wall having an interior surface and a substantially planar bottom wall having an interior surface, said side wall interior surface and said bottom wall interior surface intersecting at a right angle, each of said side wall and said bottom wall having an opening, said side wall opening and said bottom wall opening meeting to form a recess adapted to receive the wheel, a first protrusion extending from said side wall interior surface and a second protrusion extending from said bottom wall interior surface, wherein said wheel axle has first and second ends, said wheel receiving recess further comprises a cover member having spaced walls, further comprising first and second bushings, each of said bushings adapted to receive a different one of said ends of said wheel axle, and wherein said cover walls each comprise a cavity adjacent said recess adapted to receive a different one of said first and second bushings.

2. In combination, a container with a side and a bottom which meet at a corner, a cut-out at said corner, a first slot in said container side spaced from said cut-out, a second slot in said container bottom spaced from said cut-out, and a mount for a wheel with an axle, said mount comprising a base adapted to be at least partially received in said cut-out, said mount base comprising a substantially planar side wall having an interior surface and a substantially planar bottom wall having an interior surface, said mount side wall interior surface and said mount bottom wall interior surface intersecting at a right angle, each of said mount side wall and said mount bottom wall having an opening, said mount side wall opening and said mount bottom wall opening meeting to form a recess adapted to receive said wheel, a first protrusion extending from said mount side wall interior surface adapted to be received in said first slot and a second protrusion extending from said bottom wall interior surface adapted to be received in said second slot, wherein said wheel axle has first and second ends, said wheel receiving recess further comprises a cover having spaced walls, further comprising first and second bushings, each of said bushings adapted to receive a different one of said ends of said wheel axle, and wherein said cover walls each comprise a cavity adjacent said recess adapted to receive a different one of said first and second bushings.

* * * * *